United States Patent
Bang

(10) Patent No.: US 9,870,770 B2
(45) Date of Patent: Jan. 16, 2018

(54) VOICE RECOGNITION DEVICE AND METHOD IN VEHICLE

(71) Applicant: Hyundai Motor Company, Seoul (KR)

(72) Inventor: KyuSeop Bang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/931,459

(22) Filed: Nov. 3, 2015

(65) Prior Publication Data

US 2016/0133252 A1 May 12, 2016

(30) Foreign Application Priority Data

Nov. 10, 2014 (KR) ........................ 10-2014-0155660

(51) Int. Cl.
| | | |
|---|---|---|
| *G10L 15/00* | (2013.01) | |
| *G10L 15/20* | (2006.01) | |
| *G10L 21/02* | (2013.01) | |
| *G10L 21/06* | (2013.01) | |
| *G06F 3/16* | (2006.01) | |
| *H04R 3/00* | (2006.01) | |
| *H04R 1/10* | (2006.01) | |
| *G10L 21/0216* | (2013.01) | |
| *G10L 21/0316* | (2013.01) | |
| *G10L 21/0208* | (2013.01) | |

(52) U.S. Cl.
CPC ............ *G10L 15/20* (2013.01); *H04R 1/1083* (2013.01); *H04R 3/005* (2013.01); *G10L 21/0208* (2013.01); *G10L 21/0316* (2013.01); *G10L 2021/02161* (2013.01)

(58) Field of Classification Search
CPC ......... G10L 15/00; G10L 15/20; G10L 21/02; G10L 21/06; G06F 3/16
USPC .............. 704/225, 226, 228, 233, 239, 275; 455/425
See application file for complete search history.

(56) References Cited

U.S. PATENT DOCUMENTS

| | | | | |
|---|---|---|---|---|
| 6,847,723 | B1 * | 1/2005 | Kiuchi ............... | G01C 21/3608 379/406.09 |
| 2003/0069727 | A1 * | 4/2003 | Krasny ................... | G10L 15/20 704/228 |
| 2006/0253282 | A1 * | 11/2006 | Schmidt ............... | G07C 5/0808 704/233 |

(Continued)

FOREIGN PATENT DOCUMENTS

| | | |
|---|---|---|
| JP | 2008-020872 A | 1/2008 |
| JP | 2009-300537 A | 12/2009 |

(Continued)

*Primary Examiner* — Seong Ah A Shin

(74) *Attorney, Agent, or Firm* — Mintz Levin Cohn Ferris Glovsky and Popeo, P.C.; Peter F. Corless

(57) ABSTRACT

A voice recognition system in a vehicle includes: a first microphone mounted in the vehicle that collects voice data of an occupant of the vehicle; a second microphone provided in a mobile device of the occupant that collects voice data of the occupant; and a voice recognition device connected to the mobile device through local wireless communication including a noise elimination portion eliminating noise in the voice data collected by the first microphone or the second microphone and a voice recognition portion performing voice recognition using the voice data from which noise is eliminated by the noise elimination portion.

9 Claims, 4 Drawing Sheets

(56) References Cited

U.S. PATENT DOCUMENTS

| | | | | |
|---|---|---|---|---|
| 2007/0041589 A1* | 2/2007 | Patel | ............ | H04M 1/6066 381/73.1 |
| 2007/0088548 A1* | 4/2007 | Yamamoto | ............ | G10L 25/78 704/239 |
| 2009/0216526 A1* | 8/2009 | Schmidt | ............ | G10L 21/0208 704/226 |
| 2009/0292536 A1* | 11/2009 | Hetherington | ............ | G10L 19/012 704/225 |
| 2012/0094657 A1* | 4/2012 | Gullapalli | ............ | H04M 1/6091 455/425 |
| 2014/0114665 A1* | 4/2014 | Murgia | ............ | G10L 21/0216 704/275 |
| 2014/0122090 A1* | 5/2014 | Park | ............ | G06F 3/167 704/275 |
| 2015/0066487 A1* | 3/2015 | Matsuo | ............ | G10L 19/0212 704/204 |

FOREIGN PATENT DOCUMENTS

| | | | |
|---|---|---|---|
| KR | 2000-0040570 A | 7/2000 | |
| KR | 2001-0106799 A | 12/2001 | |
| KR | 2009-0129739 A | 12/2009 | |
| KR | 2010-0029591 A | 3/2010 | |

\* cited by examiner

VOICE RECOGNITION DEVICE AND METHOD IN VEHICLE

CROSS-REFERENCE TO RELATED APPLICATION

This application claims priority to and the benefit of Korean Patent Application No. 10-2014-0155660 filed in the Korean Intellectual Property Office on Nov. 10, 2014, the entire contents of which are incorporated herein by reference.

BACKGROUND OF THE DISCLOSURE (a) Technical Field

The present disclosure relates generally to a voice recognition system in a vehicle and a method thereof and, more specifically, to a voice recognition system in a vehicle and a method that collects voice data of an occupant and performs voice recognition of the occupant.

(b) Description of the Related Art

Recently, various devices have been designed to be operated by voice recognition of a driver, and thus, the driver conveniently does not need to directly operate the devices. However, when the driver uses a voice recognition device or a hands-free device, voice recognition performance of the voice recognition device or speech quality of the hands-free device can deteriorate due to other noises, such as noises generated at the vehicle body or an external noise.

In order to solve these problems, voice recognition can be performed by installing a high-sensitivity microphone or a microphone array system having two or more microphones in the vehicle. However, this method requires additional space in the vehicle, which can increase manufacturing costs.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide a voice recognition system in a vehicle and a method that collects voice data of an occupant and performs voice recognition of the occupant using a microphone of a mobile device possessed by the occupant and another microphone mounted in the vehicle. The present disclosure may be used to obtain other technical objects that are not mentioned in detail.

A voice recognition system in a vehicle according to embodiments of the present disclosure includes: a first microphone mounted in the vehicle that collects voice data of an occupant of the vehicle; a second microphone provided in a mobile device of the occupant that collects voice data of the occupant; and a voice recognition device connected to the mobile device through local wireless communication including a noise elimination portion eliminating noise in the voice data collected by the first microphone or the second microphone and a voice recognition portion performing voice recognition using the voice data from which noise is eliminated by the noise elimination portion.

The voice recognition device may further include: a filter determination portion collecting mobile device information of the mobile device and determining a filter for correcting the voice data collected by the second microphone based on the mobile device information; and a correction portion correcting the voice data collected by the second microphone using the filter determined by the filter determination portion.

The second microphone is disposed in the vehicle at a location that is spaced apart from the first microphone by a predetermined distance.

The voice recognition portion may include: a feature extraction portion extracting a feature parameter of the voice data from which noise is eliminated by the noise elimination portion; a parameter setting portion adjusting the feature parameter based on a recognition rate of the feature parameter; a storage portion storing voice recognition data; and a meaning extraction portion extracting meaning of the voice data from which noise is eliminated by the noise elimination portion by comparing the feature parameter to the voice recognition data.

Furthermore, a voice recognition method in a vehicle according to embodiments of the present disclosure includes: collecting voice data of an occupant of the vehicle using a first microphone mounted in the vehicle and a second microphone provided in a mobile device of the occupant; eliminating, by a voice recognition device, noise in the voice data collected by the first microphone or the second microphone; and performing, by the voice recognition device, voice recognition of the voice data from which noise is eliminated. The voice recognition device is connected to the mobile device through local wireless communication The voice recognition method may further include: collecting, by the voice recognition device, mobile device information of the mobile device; determining, by the voice recognition device, a filter for correcting the voice data collected by the second microphone based on the mobile device information; and correcting, by the voice recognition device, the voice data collected by the second microphone using the determined filter.

The second microphone may be disposed in the vehicle at a location that is spaced apart from the first microphone by a predetermined distance.

The voice recognition method may further include: extracting, by the voice recognition device, a feature parameter of the voice data from which noise is eliminated by the noise elimination portion; adjusting, by the voice recognition device, the feature parameter based on a recognition rate of the feature parameter; storing, by the voice recognition device, voice recognition data; and extracting, by the voice recognition device, meaning of the voice data from which noise is eliminated by the noise elimination portion by comparing the feature parameter to the voice recognition data.

Furthermore, according to embodiments of the present disclosure, a non-transitory computer readable medium containing program instructions for performing a voice recognition method in a vehicle, in which voice data of an occupant of the vehicle is collected using a first microphone mounted in the vehicle and a second microphone provided in a mobile device of the occupant, includes: program instructions that eliminate noise in the voice data collected by the first microphone or the second microphone; and program instructions that perform voice recognition of the voice data from which noise is eliminated. The voice recognition device is connected to the mobile device through local wireless communication.

The computer readable medium may further include: program instructions that collect mobile device information of the mobile device; program instructions that determine a filter for correcting the voice data collected by the second microphone based on the mobile device information; and program instructions that correct the voice data collected by the second microphone using the determined filter.

The second microphone may be disposed in the vehicle at a location that is spaced apart from the first microphone by a predetermined distance.

The computer readable medium may further include: program instructions that extract a feature parameter of the voice data from which noise is eliminated by the noise elimination portion; program instructions that adjust the feature parameter based on a recognition rate of the feature parameter; program instructions that store voice recognition data; and program instructions that extract meaning of the voice data from which noise is eliminated by the noise elimination portion by comparing the feature parameter to the voice recognition data.

According to embodiments of the present disclosure, voice recognition performance of a voice recognition device and speech quality of a hands-free device can be improved. Further, since a microphone array system is implemented in part by a microphone possessed by the occupant, manufacturing costs of the vehicle can be reduced.

DETAILED DESCRIPTION OF THE EMBODIMENTS

Figure 1:
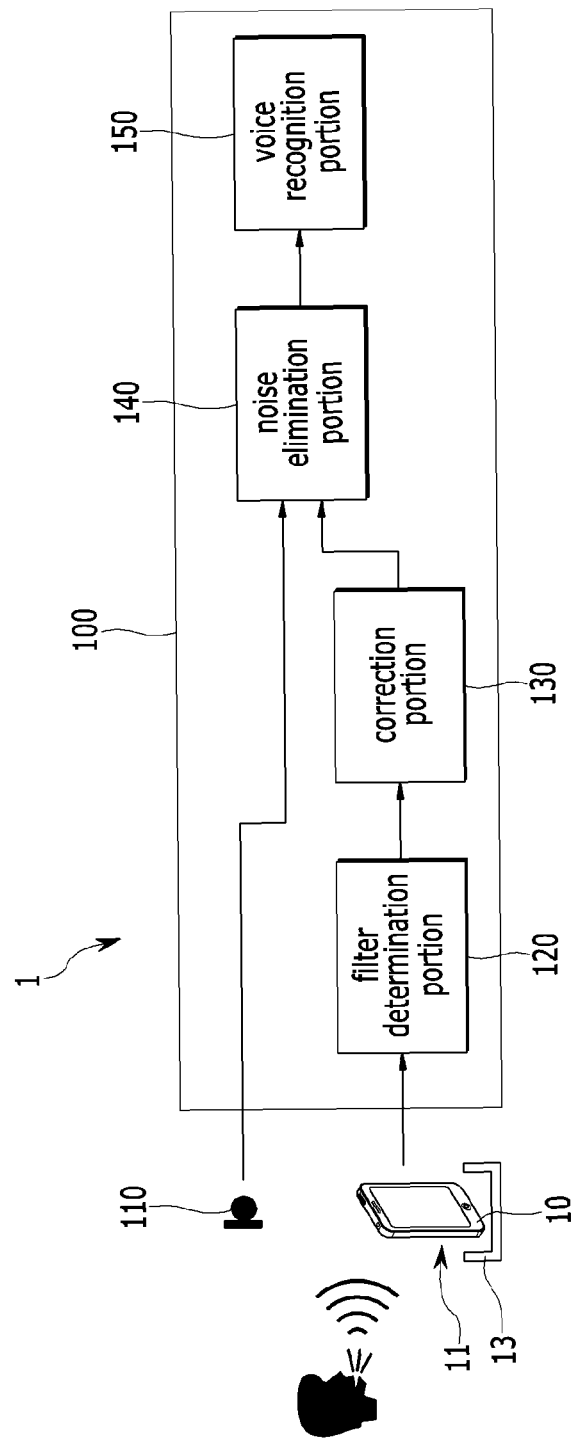
FIG. 1 is a block diagram of a voice recognition system in a vehicle according to embodiments of the present disclosure.

Hereinafter, embodiments of the present disclosure will be described in detail with reference to accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Furthermore, throughout this specification and the claims that follow, unless explicitly described to the contrary, the word "comprise/include" or variations such as "comprises/includes" or "comprising/including" will be understood to imply the inclusion of stated elements but not the exclusion of any other elements. In addition, throughout this specification and the claims which follow, a portion means a unit that performs a specific function or operation, and can be realized by hardware or software, or a combination of both.

Throughout this specification, a mobile device of an occupant can perform a voice call or video call, and can be connected to a voice recognition device in a vehicle through local wireless communication. The mobile device may be a smartphone, a cellular phone, a personal digital assistance (PDA), etc.

It is also understood that the term "vehicle" or "vehicular" or other similar term as used throughout this specification is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art. The control unit may be installed in the voice recognition device, for example.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a block diagram of a voice recognition system 1 in a vehicle according to embodiments of the present disclosure.

As shown in FIG. 1, a voice recognition device 100 according to embodiments of the present disclosure is connected to a microphone 10 (hereinafter referred to as "second microphone") which is a mobile device of an occupant in a vehicle through local wireless communication, for example, Bluetooth communication. The voice recognition device 100 collects voice data of the occupant and information of the mobile device. The information of the mobile device may include a manufacturer of the mobile device, a model number of the mobile device, and so on.

The voice recognition system 1 includes a first microphone 110 mounted in the vehicle, a second microphone 10 mounted in the mobile device of the occupant, and a voice recognition device 100 performing voice recognition from the voice data collected by the first microphone 110 and the second microphone 10. The voice recognition device 100 includes a filter determination portion 120, a correction portion 130, a noise elimination portion 140, and a voice recognition portion 150. The voice recognition device 100 may include at least one processor which is operated by a preset program, and the predetermined program performs respective steps of the method for voice recognition according to embodiments of the present disclosure.

The second microphone 10 may be disposed in the vehicle spaced apart from the first microphone 110 by a predetermined distance. The predetermined distance is a distance that can verify that voice data collected by the first microphone 110 and the second microphone 10 is identical to a voice of the occupant. That is, in order to realize a microphone array by using the first microphone 110 and the second microphone, the first microphone 110 and the second microphone 10 can be disposed apart from one another by the predetermined distance. As such, when the microphone array is realized by using the first microphone 110 and the second microphone 10, it is possible to obtain high directivity. For example, a wireless charging device 13 or a stand can be installed in the vehicle, and the first microphone 110 can be installed in the vehicle spaced apart from the wireless charging device or the stand by the predetermined distance (e.g., 50 cm). The second microphone 10 is mounted to the wireless charging device or the stand and collects voice data of the occupant.

The first microphone 110 is mounted in the vehicle, and collects voice data of the occupant.

The filter determination portion 120 collects mobile device information of the mobile device 11, and determines a filter that corrects the voice data collected by the second microphone 10 based on the mobile device information collected by the mobile device. Since manufacturers of mobile devices are different, characteristics of the second microphone of the mobile device are different from each other. Therefore, it is needed to correct the voice data collected by the second microphone using the filter determined by the filter determination portion 120.

The correction portion 130 adjusts a frequency characteristic or gain of the voice data collected by second microphone 10 using the determined filter by the filter determination portion 120.

The noise elimination portion 140 extracts and eliminates noise included in the voice data transmitted from the correction portion 130. Further, the noise elimination portion 140 may extract and eliminate noise included in the voice data collected by the first microphone 110.

The voice recognition portion 150 performs voice recognition of the voice data from which noise is eliminated by the noise elimination portion 140.

Figure 2:
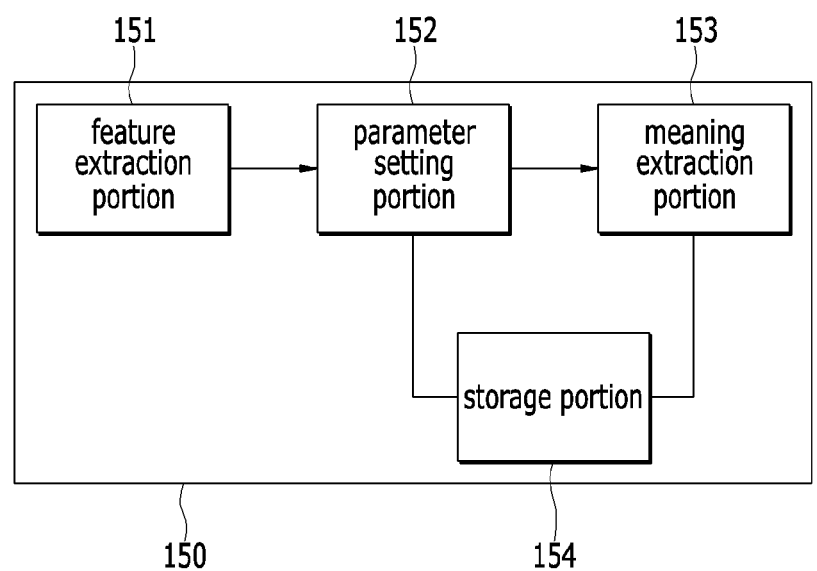
FIG. 2 is a block diagram of a voice recognition portion according to embodiments of the present disclosure.

FIG. 2 is a block diagram of a voice recognition portion according to embodiments of the present disclosure.

As shown in FIG. 2, the voice recognition portion 150 includes a feature extraction portion 151 extracting feature parameter of the voice data that noise is eliminated, a parameter setting portion 152 setting a reference parameter based on a recognition result or a misrecognition result of the feature parameter, a meaning extraction portion 153 extracting meaning of the voice data based on the feature parameter, and a storage portion 154 storing a voice recognition data used in meaning extraction of the voice data. The meaning extraction portion 153 recognizes the voice data collected by the microphones by comparing the feature parameter to the voice recognition data stored in the storage portion 154. When the reference parameter is increased, the recognition rate of the voice data is increased. On the other hand, the reference parameter is decreased, the recognition rate of the voice data is decreased.

Figure 3:
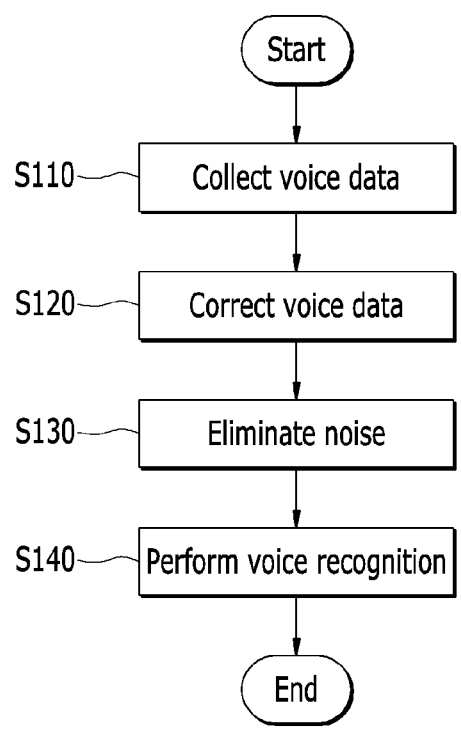
FIG. 3 is a flowchart of a voice recognition method in a vehicle according to embodiments of the present disclosure.

FIG. 3 is a flowchart of a voice recognition method in a vehicle according to embodiments of the present disclosure.

The voice recognition device connects the mobile device through the local wireless communication (for example, Bluetooth communication), and collects voice data of the occupant using the first microphone 110 mounted in the vehicle and the second microphone 10 of the mobile device at step S110. And the filter determination portion 120 collects information of the mobile device.

The correction portion 130 corrects the frequency characteristic or gain of the voice data collected by the second microphone 10, at step S120. The filter determination portion may determine a filter that corrects the voice data collected by the second microphone 10 based on the mobile device information of the mobile device between the step S120 and S130.

The noise elimination portion 140 eliminates noise included in the voice data transmitted from the correction portion 130 or the voice data collected by the first microphone 110 at step S130.

The voice recognition portion 150 performs voice recognition based on the voice data of which the noise is eliminated, at step S140, and controls devices disposed in the vehicle based on a result of the voice recognition. In the step S140, the parameter setting portion may set a reference parameter based on the result of the voice recognition of the voice data.

Figure 4:
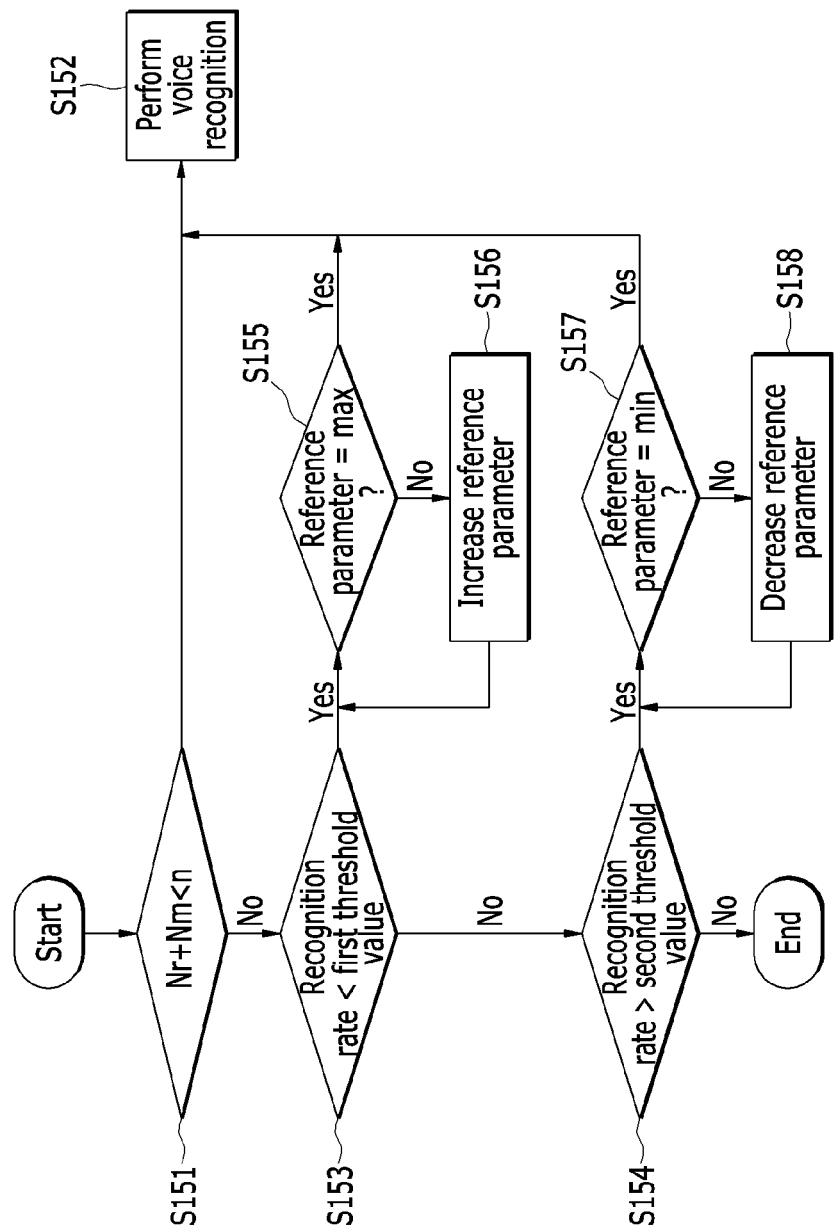
FIG. 4 is a flowchart of a setting method of a reference parameter according to embodiments of the present disclosure.

FIG. 4 is a flowchart of a setting method of a reference parameter according to embodiments of the present disclosure. The reference parameter is used to adjust the recognition rate of the voice data collected by the microphones.

The parameter setting portion 152 determines whether to adjust the reference parameter based on a result of recognition with respect to the voice data, at step S151, and the meaning extraction portion 153 performs voice recognition based on the result of the reference parameter set by the parameter setting portion 152, at step S152.

In detail, the parameter setting portion 152 compares a summation of a number of recognitions Nr and a number of misrecognitions Nm to 'n'. When the summation of the number of recognitions Nr and the number of misrecognitions Nm determined by the meaning extraction portion 153 is less than 'n', voice recognition is performed by the meaning extraction portion 153. When the summation is greater than 'n', the parameter setting portion 152 determines that the reference parameter needs to be adjusted and calculates a recognition rate R. At this time, 'n' is natural number. As the size of 'n' is smaller, the setting number of the reference parameter is increased. The recognition rate R is calculated by the following equation. $R = Nr/(Nr+Nm)$ Here, R denotes the recognition rate, Nr denotes the number of recognitions, and Nm denotes the number of misrecognitions.

The parameter setting portion 152 compared the recognition rate to a predetermined first threshold value at step S153. When the recognition rate is less than a first threshold value, the reference parameter is increased until the reference parameter reaches the maximum value at step S155. When the reference parameter reaches the maximum value, the meaning extraction portion 153 performs voice recognition at step S152.

When the recognition rate is greater than the first threshold value, the parameter setting portion 152 compares the recognition rate to a predetermined second threshold value at step S154. When the recognition rate is greater than the second threshold value, the reference parameter is decreased until the reference parameter reaches a predetermined minimum value at steps S157 and S158. When the reference parameter reaches the predetermined minimum value, the meaning extraction portion 153 performs voice recognition at step S152.

While embodiments of the present disclosure are herein described in which the voice data is collected by the second microphone of the mobile device when the occupant uses the voice recognition device in the vehicle, it is to be understood that the disclosure is not limited to the disclosed embodiments, but the voice data can be collected by a second microphone of a hands-free device when the occupant uses a hands-free device. According to embodiments of the present disclosure, since the microphone array is realized by using the first microphone mounted in the vehicle and the second microphone of the mobile device of the occupant, internal spatial utility of the vehicle can be increased and cost for mounting an additional microphone in the vehicle can be reduced. Furthermore, according to embodiments of the present disclosure, since the recognition rate is calculated according to the result of the recognition of the voice data, and the increment and decrement of the reference parameter is adjusted based on the recognition rate, it is possible to improve voice recognition performance of the voice recognition device.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

| <Description of symbols> | |
|---|---|
| 10: second microphone | 110: first microphone |
| 120: filter determination portion | 130: correction portion |
| 140: noise elimination portion | 150: voice recognition portion |
| 151: feature extraction portion | 152: parameter setting portion |
| 153: meaning extraction portion | 154: storage portion |

What is claimed is:

1. A voice recognition system in a vehicle, comprising:
a first microphone mounted in the vehicle that collects voice data of an occupant of the vehicle;
a second microphone provided in a mobile device of the occupant that collects voice data of the occupant; and
a voice recognition device connected to the mobile device through local wireless communication including a noise elimination portion eliminating noise in the voice data collected by the first microphone or the second microphone and a voice recognition portion performing voice recognition using the voice data from which noise is eliminated by the noise elimination portion,
wherein the voice recognition portion further includes:
a feature extraction portion extracting a reference parameter of the voice data from which noise is eliminated by the noise elimination portion;
a parameter setting portion adjusting the reference parameter based on a recognition rate of the reference parameter;
a storage portion storing voice recognition data; and
a meaning extraction portion extracting meaning of the voice data from which noise is eliminated by the noise elimination portion by comparing the reference parameter to the voice recognition data,
wherein the parameter setting portion calculates the recognition rate when a summation of a number of recognition and a number of misrecognition is greater than a predetermined value,
wherein the parameter setting portion increases the reference parameter until the reference parameter reaches a predetermined maximum value when the recognition rate is less than a first threshold value, and then the meaning extraction portion performs voice recognition when the reference parameter reaches the predetermined maximum value, and
wherein the parameter setting portion decreases the reference parameter until the reference parameter reaches a predetermined minimum value when the recognition rate is greater than a second threshold value, and then the meaning extraction portion performs voice recognition when the reference parameter reaches the predetermined minimum value.

2. The voice recognition system of claim 1, wherein the voice recognition device further includes:
a filter determination portion collecting mobile device information of the mobile device and determining a filter for correcting the voice data collected by the second microphone based on the mobile device information; and
a correction portion correcting the voice data collected by the second microphone using the filter determined by the filter determination portion.

3. The voice recognition system of claim 1, wherein the second microphone is disposed in the vehicle at a location that is spaced apart from the first microphone by a predetermined distance.

4. A voice recognition method in a vehicle, comprising:
collecting voice data of an occupant of the vehicle using a first microphone mounted in the vehicle and a second microphone provided in a mobile device of the occupant;
eliminating, by a voice recognition device, noise in the voice data collected by the first microphone or the second microphone;
performing, by the voice recognition device, voice recognition of the voice data from which noise is eliminated;
extracting, by the voice recognition device, a reference parameter of the voice data from which noise is eliminated by the noise elimination portion;
adjusting, by the voice recognition device, the reference parameter based on a recognition rate of the reference parameter;
storing, by the voice recognition device, voice recognition data; and
extracting, by the voice recognition device, meaning of the voice data from which noise is eliminated by the noise elimination portion by comparing the reference parameter to the voice recognition data,
wherein the voice recognition device is connected to the mobile device through local wireless communication,
wherein the parameter setting portion calculates the recognition rate when a summation of a number of recognition and a number of misrecognition is greater than a predetermined value,
wherein the parameter setting portion increases the reference parameter until the reference parameter reaches a predetermined maximum value when the recognition rate is less than a first threshold value, and then the meaning extraction portion performs voice recognition when the reference parameter reaches the predetermined maximum value, and
wherein the parameter setting portion decreases the reference parameter until the reference parameter reaches a predetermined minimum value when the recognition rate is greater than a second threshold value, and then the meaning extraction portion performs voice recognition when the reference parameter reaches the predetermined minimum value.

5. The voice recognition method of claim 4, further comprising:

collecting, by the voice recognition device, mobile device information of the mobile device;

determining, by the voice recognition device, a filter for correcting the voice data collected by the second microphone based on the mobile device information; and correcting, by the voice recognition device, the voice data collected by the second microphone using the determined filter.

6. The voice recognition method of claim 4, wherein the second microphone is disposed in the vehicle at a location that is spaced apart from the first microphone by a predetermined distance.

7. A non-transitory computer readable medium containing program instructions for performing a voice recognition method in a vehicle, in which voice data of an occupant of the vehicle is collected using a first microphone mounted in the vehicle and a second microphone provided in a mobile device of the occupant, the computer readable medium comprising:

program instructions that eliminate noise in the voice data collected by the first microphone or the second microphone;

program instructions that perform voice recognition of the voice data from which noise is eliminated;

program instructions that extract a reference parameter of the voice data from which noise is eliminated by the noise elimination portion;

program instructions that adjust the reference parameter based on a recognition rate of the reference parameter;

program instructions that store voice recognition data; and program instructions that extract meaning of the voice data from which noise is eliminated by the noise elimination portion by comparing the reference parameter to the voice recognition data, wherein the voice recognition device is connected to the mobile device through local wireless communication, wherein the parameter setting portion calculates the recognition rate when a summation of a number of recognition and a number of misrecognition is greater than a predetermined value, wherein the parameter setting portion increases the reference parameter until the reference parameter reaches a predetermined maximum value when the recognition rate is less than a first threshold value, and then the meaning extraction portion performs voice recognition when the reference parameter reaches the predetermined maximum value, and wherein the parameter setting portion decreases the reference parameter until the reference parameter reaches a predetermined minimum value when the recognition rate is greater than a second threshold value, and then the meaning extraction portion performs voice recognition when the reference parameter reaches the predetermined minimum value.

8. The computer readable medium of claim 7, further comprising:

program instructions that collect mobile device information of the mobile device;

program instructions that determine a filter for correcting the voice data collected by the second microphone based on the mobile device information; and program instructions that correct the voice data collected by the second microphone using the determined filter.

9. The computer readable medium of claim 7, wherein the second microphone is disposed in the vehicle at a location that is spaced apart from the first microphone by a predetermined distance.

* * * * *